UNITED STATES PATENT OFFICE.

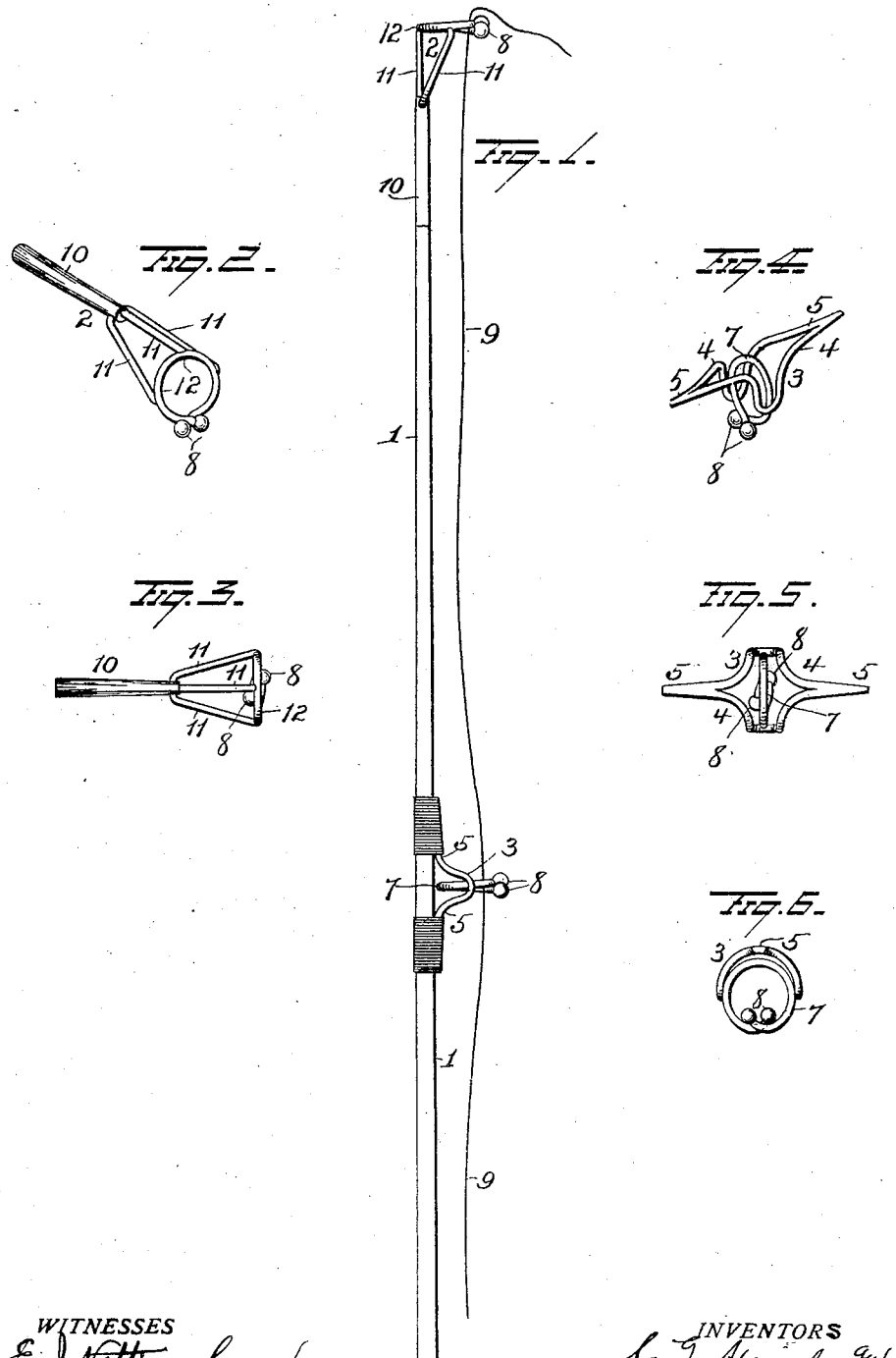

CHRISTIAN G. HOERLE AND WILLIAM F. HOERLE, OF TORRINGTON, CONNECTICUT.

LINE-GUIDE FOR FISHING-POLES.

No. 863,606.   Specification of Letters Patent.   Patented Aug. 20, 1907.

Application filed January 28, 1907. Serial No. 354,483.

*To all whom it may concern:*

Be it known that we, CHRISTIAN G. HOERLE and WILLIAM F. HOERLE, residents of Torrington, in the county of Litchfield and State of Connecticut, have invented certain new and useful Improvements in Line-Guides for Fishing-Poles; and we do hereby declare the following to be a full, clear, and exact description of the invention, such as will enable others skilled in the art to which it appertains to make and use the same.

Our invention relates to improved line guides for fishing rods, the object of the invention being to provide improvements of this character in which the line can be entered and removed at any part of the length of the line and overcome the necessity of drawing the entire line through the guide and the removal of the hooks, sinker, etc.

A further object is to provide improvements of this character of neat and attractive appearance, strong and durable in use, and which will prevent possibility of accidental escape of the line from the guide.

With these and other objects in view, the invention consists in certain novel features of construction and combinations and arrangements of parts as will be more fully hereinafter described and pointed out in the claims.

In the accompanying drawings; Figure 1 is a view in elevation of a fishing rod illustrating the application of our improvements thereto; Figs. 2 and 3 are enlarged views of the line guide and the means for supporting the same at the end of the rod. Figs. 4 and 5 are views of the guide and frame or support adapted for attachment to the body of the rod and Fig. 6 is a view showing slight modification of the guide.

1 represents a fishing pole to which our improved line guides 2 and 3 are secured and will now be described in detail. The guides 3 along the pole being alike the description of one will apply alike to all. Each guide 3 comprises a wire frame 4 consisting of two wires welded or otherwise secured together at their ends forming tongues 5 to be secured against the pole by binders of any approved form, and bowed outward between their ends and soldered to a spring wire ring 7. The wire ring 7 has overlapping ends and is provided at its ends, with balls or enlargements 8, and as the ring is of spring metal the ends of the wire will be tightly held together to prevent accidental escape of the line 9, yet by turning the line at about a right angle to the pole, the line can be easily pulled out between the enlarged overlapping ends of ring 7 and can be as easily inserted into the ring when desired.

The line guide 2, at the tip of the pole, comprises a sleeve 10 to fit onto the end of the pole and provided with three (more or less) deflecting rods 11 secured to a ring 12, which they support. This ring 12 is precisely like the rings 7 of guides 3 and the line can be forced into the ring between its enlarged overlapping ends.

In the modification illustrated in Fig. 6, the overlapping ends of the ring 7 are bent inward and the balls or enlargements 8 are therefore inside the ring, and these ends may be otherwise bent as may be desired.

By constructing the line guides as above explained, no obstruction is offered to the free movement of the line in the guides and there is no sharp ends to catch and hold or cut the line.

The improvements are extremely simple, yet are a decided improvement over line guides such as heretofore known.

Other slight changes might be made in the general form and arrangement of the parts described without departing from our invention and hence, we do not restrict ourselves to the precise details set forth but consider ourselves at liberty to make such slight changes and alterations as fairly fall within the spirit and scope of our invention.

Having fully described our invention, what we claim as new and desire to secure by Letters-Patent is:—

1. A device of the character described, comprising a spring ring having overlapping ends to confine a line within the ring and permit free movement of said line.

2. A line guide, comprising a ring having overlapping ends spring pressed together, and enlargements on the ends of said ring preventing disengagement of said ends.

3. A line guide, comprising a spring wire bent into circular form with overlapping ends spring held together, and enlargements on the ends of said wire preventing disengagement of said ends.

4. A line guide, comprising a support to be secured to a pole, of a wire secured to the support and bent into circular form and having overlapping ends spring held together, and enlargements on the ends of the wire preventing disengagement of said ends.

5. A line guide for fishing poles, comprising a wire frame having tongues at its ends to be secured to a pole, a wire secured to the wire frame and bent into circular form and having overlapping ends spring held together, and enlargements on the ends of the wire.

6. A line guide for fishing poles, comprising a support adapted for attachment to a pole, and a spring wire ring secured to the support and having contacting overlapping ends to confine a line within said ring and permit free movement of said line.

In testimony whereof, we have signed this specification in the presence of two subscribing witnesses.

CHRISTIAN G. HOERLE.
WILLIAM F. HOERLE.

Witnesses:
G. NORDBERG,
DWIGHT W. POST.